United States Patent Office 2,810,725
Patented Oct. 22, 1957

2,810,725

PYRIDOXAL DERIVATIVES OF ISONICOTINIC ACID HYDRAZIDE

Jack Bernstein, New Brunswick, N. J., assignor to Olin Mathieson Chemical Corporation, New York, N. Y., a corporation of Virginia No Drawing. Application December 20, 1954, Serial No. 476,608

7 Claims. (Cl. 260—295)

This invention relates to and has for its object the provision of (A) compounds of the general formula

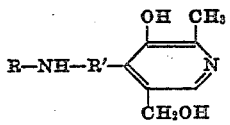

wherein R is a member of the class consisting of isonicotinoyl, picolinoyl, 2-furoyl and 2-thenoyl, and R' is a member of the class consisting of —N=CH— and —NH—CH₂—; (B) acid-addition salts thereof; and (C) methods of producing A and B.

The compounds of this invention have valuable pharmacodynamic properties, inter alia, vitamin B₆ activity and antimycobacterial action. Certain of these compounds are especially useful in the chemotherapeutic treatment of tuberculosis. While the antimycobacterial agent isoniazid is highly effective against human, bovine and Calmette-Guerin bacillus strains of *Mycobacterium tuberculosis*, unpleasant side-effects (including peripheral neuritis) have been reported in man after prolonged treatment with high doses. The compounds of this invention, particularly the compound pyridoxal isonicotinoyl hydrazone (and its acid-addition salts), possesses a high order of antituberculous activity when administered internally in the same general way as isoniazid, for example, but do not produce these side effects. They can be used to advantage concurrently, or in conjunction, with other antituberculous agents, inter alia: p-aminosalicylic acid, dihydrostreptomycin, streptomycin, p-(lower alkyl)oxy benzaldehyde thiosemicarbazones, and isoniazid.

The hydrazone compounds of this invention are prepared by a method which essentially comprises oxidizing a pyridoxine acid-addition salt (such as the hydrochloride, or the sulfate) using, inter alia, potassium permanganate, and (especially) manganese dioxide and sulfuric acid as the oxiding agent. To the reaction mixture is then added a hydrazide reactant of the general formula R—NH—NH₂, wherein R has the meaning given hereinbefore, and a base, inter alia, a hydroxide (e. g. sodium hydroxide, potassium hydroxide, calcium hydroxide, and ammonium hydroxide), a bicarbonate (e. g. sodium bicarbonate), and (especially) sodium acetate; and the reaction product is recovered.

The hydrazide reactants required for the purposes of this invention may be obtained by known general procedures [e. g. Meyer et al., Monatschefte, 33, 400 (1912); Curtis et al., J.-Prakt. Chem. 65:1, series II (1902)], and include: 2-furoyl, 2-thenoyl, picolinoyl and (especially) isonicotinoyl hydrazide.

Alternatively, the hydrazone compounds of this invention may be prepared by a variation of the method described hereinbefore, employing a pre-formed member of the class consisting of pyridoxal and the acid-addition salts thereof, in a solvent for the reactants (especially water), in place of the reaction mixture.

Wide latitude is permissible with respect to reaction conditions. Thus, in preparing the hydrazones, water is preferred as the reaction medium, but other solvents, inter alia, the lower alkanols, dioxane, the cellosolves (2-ethoxy 2-benzyloxy 2-butoxy or 2-methoxy-ethanol), and dimethylformamide, may be used.

In the foregoing methods, the hydrazone bases may be obtained directly as such or in the form of their acid-addition salts. By conventional methods (e. g., by neutralization with alkali), the acid-addition salts may be converted into the free bases; and the free bases may be converted to other acid-addition salts by reacting them with an acid which forms a pharmacologically-acceptable salt, inter alia, hydrobromic, boric, nitric, lactic, tartaric, citric, acetic, succinic, phosphoric, sulfuric, gluconic, methionine, p-aminosalicylic acid, p-toluenesulfonic acid, maleic, fumaric, and (especially) hydrochloric.

The hydrazine compounds of this invention are obtained by reduction of the corresponding hydrazones, which reduction is preferably effected by treatment with hydrogen in the presence of a suitable catalyst, such as platinum dioxide, palladium on charcoal, etc., until the required amount of hydrogen has been absorbed. The reduction may also be effected by treatment with nascent hydrogen provided by sodium in liquid ammonia, sodium amalgan, zinc-copper couple, etc.; or electrolytic reduction may be used.

In the synthesis of the hydrazine compounds of this invention, one may prepare and isolate the corresponding hydrazone and then hydrogenate to obtain the desired hydrazine; or one may carry out the hydrazone formation and hydrogenation thereof together, in the same reaction medium.

The compounds of this invention are administered in the treatment of tuberculosis in the same general manner and in the same type of formulations as isoniazid, with the concentration adjusted in accordance with the difference between their therapeutic ratios and that of isoniazid.

Thus, a therapeutically-active quantity of pyridoxal isonicotinoyl hydrazone, for example, may be associated with a carrier, which is preferably a solid material; or the compound may be adsorbed on or mixed with a resin. The carrier for the compound may also be a sterile liquid vehicle or a liquid pharmaceutical carrier, such as corn oil or syrup. The formulations may take the form of tablets, powder packets, capsules, or other dosage-unit forms which are useful for oral administration; and these may be prepared in the conventional manner. For example, two-piece gelatin capsules may be made containing a mixture of the pyridoxal isonicotinoyl hydrazone and excipients (e. g., starch, talc, stearic acid, magnesium stearate), with the pyridoxal isonicotinoyl hydrazone present in an amount of the order of about 20 to 200 mg. or more. A sterile parenteral formulation may be prepared, for example, by suspending pyridoxal isonicotinoyl hydrazone in water (e. g., about 100 mg./ml.), adding a preservative, such as chlorbutanol (5 mg./ml.), and then ampuling or packaging in multidose vials and sterilizing.

In addition to their use in man, the compounds of this invention may be used with similar therapeutic effect in animals, such as poultry and cows. For such use, they may be formulated as animal feed compositions, such as poultry feed compositions, containing at least 0.1 percent of the agent and a significant amount of nutritive material.

The following examples are illustrative but by no means limitative of the invention:

EXAMPLE 1

*Pyridoxal isonicotinoyl hydrazone sulfate*

To a suspension of 102.8 g. (0.5 mole) pyridoxine hydrochloride and 51.2 g. 85% manganese dioxide in 1.5 liters of water is added slowly 49 g. concentrated sulfuric acid. The resulting mixture is heated at 60–70° for three hours. The reaction mixture is then cooled and a small amount of unreacted manganese dioxide is filtered off. Then 123 g. sodium acetate and 68.5 (0.5 mole) isonicotinic acid hydrazide are added to the filtrate. Almost immediately, an orange solid precipitates. The reaction mixture is allowed to stand overnight, and the solid is filtered off. The product, pyridoxal isonicotinoyl hydrazone sulfate, weighs about 62 g. and melts at about 242–243° C. (dec.). After recrystallization from water, the melting point is 243–244° C. (dec.).

EXAMPLE 2

*Pyridoxal isonicotinoyl hydrazone*

To a solution of 33.5 g. (0.1 mole) of the pyridoxal isonicotinoyl hydrazone sulfate, prepared as in Example 1, in 200 cc. 1 N hydrochloric acid is added 200 cc. 0.5 N barium hydroxide. The precipitated barium sulfate is removed by filtration; and to the filtrate is added 24.6 g. sodium acetate. The mixture is then acidified with acetic acid, and a light yellow solid precipitates and is filtered off. The product, pyridoxal isonicotinoyl hydrazone, weighs about 25 g. and melts at about 240–245° C. (dec.). After recrystallization from 1 liter methanol and 2 liters benzene, the product weighs about 15 g. and melts at about 254–255° C. (dec.).

EXAMPLE 3

*Pyridoxal 2-thenoyl hydrazone*

A solution of 2.03 g. (0.01 mole) pyridoxal hydrochloride in 25 cc. water is added to a solution of 1.42 g. (0.01 mole) 2-thiophenecarboxylic acid hydrazide in 50 cc. water. Then 0.82 g. sodium acetate is added, and the mixture heated 15 minutes on a steam bath. After cooling, the crystalline product, pyridoxal 2-thenoyl hydrazone, is filtered off and recrystallized from dilute ethanol.

EXAMPLE 4

*Pyridoxal 2-furoyl hydrazone*

A solution of 2.03 g. (0.01 mole) pyridoxal hydrochloride in 25 cc. water is added to a solution of 1.40 g. (0.01 mole) 2-furoic acid hydrazide in 50 cc. water. Then 0.82 g. sodium acetate is added, and the mixture is heated 15 minutes on a steam bath. After cooling, the product, pyridoxal 2-furoyl hydrazone, is filtered off and recrystallized from dilute ethanol.

Alternatively, the compound is prepared as follows: To a suspension of 102.8 g. (0.5 mole) pyridoxine hydrochloride and 51.2 g. (0.5 mole) 85% manganese dioxide in 1.5 liters of water is added slowly 49.1 g. concentrated sulfuric acid. This mixture is heated at 60–70° for 3 hours, cooled and filtered to remove a small amount of unreacted manganese dioxide. To the filtrate is added 123 g. sodium acetate and 101.5 g. (0.5 mole) 2-furoic acid hydrazide. Almost immediately, a solid precipitates out. This is filtered off and washed with water. The solid product, pyridoxal 2-furoyl hydrazone, is recrystallized from dilute ethanol.

EXAMPLE 5

*Pyridoxal picolinoyl hydrazone*

(a) To a suspension of 65.6 g. (0.32 mole) pyridoxine hydrochloride and 32.7 g. (0.32 mole) manganese dioxide (85%) in 800 cc. water is added slowly 31.7 g. concentrated sulfuric acid. The resulting mixture is heated at 60–70° C. for 3 hours, then cooled and filtered. To the filtrate is added 78.7 g. sodium acetate and 44.2 g. picolinic acid hydrazide. A solid precipitates out immediately. After allowing the reaction mixture to stand overnight, the solid, pyridoxal picolinoyl hydrazone sulfate, is filtered off and dried.

(b) To a solution of 33.5 g. (0.1 mole) of the sulfate obtained in a, in 200 cc. 1 N HCl, is added 200 cc. 0.5 N barium hydroxide solution. To precipitated barium sulfate is filtered off, and the filtrate is acidified with acetic acid. The crystalline product, pyridoxal picolinoyl hydrazone, forms slowly, and is recovered.

EXAMPLE 6

*Other pyridoxal isonicotinoyl hydrazone acid-addition salts*

Pyridoxal isonicotinoyl hydrazone hydrochloride.—To a solution of 28.6 g. (0.1 M) pyridoxal isonicotinoyl hydrazone in 500 cc. absolute ethanol is added 25 cc. 4 N (0.1 M) ethereal HCl. After the addition of 500 cc. dry ether, the hydrochloride precipitates out. It is filtered off and recrystallized from a mixture of absolute ethanol and ether.

Pyridoxal isonicotinoyl hydrazone dihydrochloride.—To a solution of 28.6 g. (0.1 M) pyridoxal isonicotinoyl hydrazone in 500 cc. absolute ethanol is added 50 cc. 4 N ethereal HCl. After the addition of approximately 500 cc. dry ether, the dihydrochloride precipitates out, is filtered off, and recrystallized from a mixture of acetonitrile and ether.

Pyridoxal isonicotinoyl hydrazone monotartrate.—To a solution of 28.6 g. (0.1 M) pyridoxal isonicotinoyl hydrazone in 500 cc. absolute ethanol is added a solution of 7.5 g. (0.05 M) anhydrous tartaric acid in 100 cc. absolute ethanol. After the addition of approximately 300 cc. dry ether, the tartrate precipitates out, is filtered off, and recrystallized from acetonitrile.

Use of a molar equivalent of p-aminosalicylic acid in place of tartaric acid in Example 6(c), yields pyridoxal isonicotinoyl hydrazone p-aminosalicylate.

EXAMPLE 7

*2 - [3 - hydroxy - 5 - (hydroxymethyl) - 2 - methyl - 4-pyridylmethyl] isonicotinic acid hydrazide*

A solution of 28.6 g. (0.1 M) pyridoxal isonicotinoyl hydrazone, prepared as in Example 2, in 200 cc. warm methanol, is shaken at 40–50° C. at a pressure of 50 lbs. hydrogen in the presence of 1 g. 5% palladium on charcoal until the theoretical amount of hydrogen has been absorbed. The catalyst is then removed by filtration, and the filtrate concentrated to 50 cc. under reduced pressure. Then about 300 cc. dry benzene is added to the residue, and the precipitated solid, 2 - [3 - hydroxy - 5 - (hydroxymethyl)-2-methyl-4-pyridylmethyl] isonicotinic acid hydrazide, is filtered off and recrystallized from methanol-ether.

EXAMPLE 8

*2 - [3 - hydroxy - 5 - (hydroxymethyl) - 2 - methyl - 4-pyridylmethyl] furoic acid hydrazide*

A solution of 27.5 g. (0.1 M) pyridoxal 2-furoyl hydrazone, prepared as in Example 4, in 200 cc. methanol is shaken at 40–50° C. and at a pressure of 50 lbs. hydrogen in the presence of 1 g. 5% palladium on charcoal, until the theoretical amount of hydrogen had been absorbed. The catalyst is then filtered off, and the filtrate concentrated to 50 cc. under reduced pressure. Then about 300 cc. dry ether is added and the precipitated solid, 2 - [3 - hydroxy - 5 - (hydroxymethyl) - 2 - methyl - 4-pyridylmethyl]furoic acid hydrazide, is filtered off and recrystallized from methanol-ether.

The invention may be variously otherwise embodied within the scope of the appended claims.

I claim:

1. A member of the class consisting of: compounds of the general formula

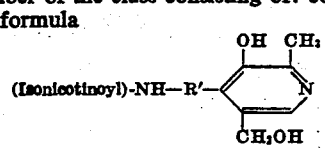

wherein R' is a member of the class consisting of $-N=CH-$ and $-NH-CH_2-$; and acid-addition salts thereof.

2. An acid-addition salt of pyridoxal isonicotinoyl hydrazone.
3. Pyridoxal isonicotinoyl hydrazone.
4. 2 - [3 - hydroxy - 5(hydroxymethyl) - 2 - methyl-4 - pyridylmethyl] isonicotinic acid hydrazide.
5. Pyridoxal isonicotinoyl hydrazone sulfate.
6. Pyridoxal isonicotinoyl hydrazone hydrochloride.
7. Pyridoxal isonicotinoyl hydrazone monotartrate.

References Cited in the file of this patent

UNITED STATES PATENTS

| | | |
|---|---|---|
| 2,683,716 | Winsten | July 13, 1954 |
| 2,703,322 | Fox | Mar. 1, 1955 |
| 2,703,323 | Karrer et al. | Mar. 1, 1955 |

FOREIGN PATENTS

| | | |
|---|---|---|
| 517,655 | Belgium | Aug. 13, 1953 |

OTHER REFERENCES

Shchukina et al.: Chem. Abst., vol. 46, cols. 10431-2 (1952).

Boone et al.: Proc. Soc. Exptl. Biol. Med., vol. 84, pp. 292-6 (1953).

Sah: J. Am. Chem. Soc., vol. 76, p. 300 (Jan. 5, 1954) (Received date July 27, 1953).

Fox: J. Org. Chem., vol. 18, pp. 983-9 (August 1953).